United States Patent
Marine, Sr. et al.

(10) Patent No.: US 6,533,042 B1
(45) Date of Patent: Mar. 18, 2003

(54) ATTACHMENT FOR TRACTOR

(76) Inventors: John R. Marine, Sr., 221 Pine Hill Dr., Aliceville, AL (US) 35442; John R. Marine, Jr., 290 Willow La., Aliceville, AL (US) 35442

( * ) Notice: Subject to any disclaimer, the term of this patent is extended or adjusted under 35 U.S.C. 154(b) by 0 days.

(21) Appl. No.: 09/534,586

(22) Filed: Mar. 27, 2000

(51) Int. Cl.$^7$ ................................................ A01B 51/00
(52) U.S. Cl. ....................... 172/272; 414/703; 414/920; 280/416.2
(58) Field of Search ................................ 172/272, 275, 172/439, 440, 441, 681, 677, 679, 683; 414/703, 920, 912, 607; 280/416.2, 416.1

(56) References Cited

U.S. PATENT DOCUMENTS

| | | | | |
|---|---|---|---|---|
| 3,231,294 A | * | 1/1966 | Horney | 280/415 |
| 3,498,638 A | * | 3/1970 | Magruder | 280/479 |
| 3,544,133 A | * | 12/1970 | Lemmon et al. | 280/479 |
| 4,019,753 A | * | 4/1977 | Kestel | 172/272 X |
| 4,415,175 A | * | 11/1983 | Kainer | 172/272 X |
| 4,850,789 A | * | 7/1989 | Zimmerman | 414/703 |
| 5,026,247 A | * | 6/1991 | Zimmernam | 414/703 |
| 5,029,650 A | * | 7/1991 | Smit | 172/272 |
| 5,169,279 A | * | 12/1992 | Zimmerman | 414/703 |
| 5,178,505 A | * | 1/1993 | Smith | 414/703 X |
| 5,692,855 A | * | 12/1997 | Burton | 172/272 X |

FOREIGN PATENT DOCUMENTS

| CH | 436815 | * | 5/1967 | ................. 172/272 |

OTHER PUBLICATIONS

Hiniker Quick Hitch Brochure, 2 pages.*

* cited by examiner

*Primary Examiner*—Victor Batson
(74) *Attorney, Agent, or Firm*—Smith, Gambrell & Russell, LLP; Robert J. Veal

(57) ABSTRACT

A three-point hitch adapter designed with a bell crank, for use on tractors. This bell crank operated hitch adapter provides for easier transfer and adjustability of implements used on tractors. The hitch adapter includes a horizontal cross bar attached to two vertical tubular members. The horizontal bar includes a rectangular centerpiece whereby two tubular members are telescopically inserted and retracted by lateral movement all the while engaged within the centerpiece. The centerpiece includes a bell crank that allows the members to be extended laterally to accommodate the implement. The vertical members have T-shaped locking means with a compression spring to help keep the implement in place at the bottom of each vertical tubular member. All vertical and horizontal adjustments can be made while the adapter is still attached to the tractor.

1 Claim, 6 Drawing Sheets

ATTACHMENT FOR TRACTOR

FIELD OF THE INVENTION

The present invention relates to the field of farm tractors and more particularly to hitch adapters for such tractors. In greater particularity the present invention relates to a hitch adapter which is variable in size and which allows the quick connection and disconnection of implements from the tractor.

BACKGROUND OF THE INVENTION

Numerous adapters have been developed over the years such as shown in the following United States patents: U.S. Pat. No. 3,829,128; U.S. Pat. No. 3,989,272; U.S. Pat. No. 4,195,860; U.S. Pat. No. 5,029,650; and, U.S. Pat. No. 3,658,361.

This invention relates to hitch adapters for a three-point hitch and more particularly to a hitch adapter for adjustable connection between tractor and an implement with the use of a bell crank arrangement.

Attachments that connect an implement to a tractor have become progressively more complex in modern tractors, due to the increase in size of the tractor. The conventional draw-bar hitch has been largely replaced by the three-point hitch, designed to connect an implement to the tractor and permit the tractor to raise and lower the implement. Today, many tractors use a three-point hitch adapter since the hitching linkages are much larger thereby making connection of the hitch to different implements exceedingly difficult. Three-point hitch adapters have significantly improved the conditions under which an operator has to attach the tractor and implement, by simplifying the hitching process.

SUMMARY OF THE INVENTION

The object of this invention is to provide a quick hitch adapter for a three-point hitch.

It is another object of this invention to provide a hitch adapter having means for support on the lower vertical arms and the middle of the horizontal cross bar of a three-point hitch whereby the adapter makes any adjustments.

The aforementioned objects are satisfied by providing a hitch adapter for connection to a three-point hitch. The hitch adapter includes a horizontal cross bar attached to two vertical tubular members. The horizontal bar includes a rectangular centerpiece whereby two tubular members are telescopically inserted and horizontally extended to selected positions all the while engaged within the centerpiece. The adapter has a bell crank which allows the tubular members and attached vertical members to be laterally extended to fit a variety of implements. The vertical members have T-shaped locking means with a compression spring to help keep the implement in place at the bottom of each vertical tubular member and to insure proper disengagement. All vertical and horizontal adjustments can be made while the adapter is still attached to the tractor.

BRIEF DESCRIPTION OF THE DRAWINGS

The preferred embodiment of this invention is illustrated in the attached drawings.

DESCRIPTION OF A PREFERRED EMBODIMENT

Figure 1:
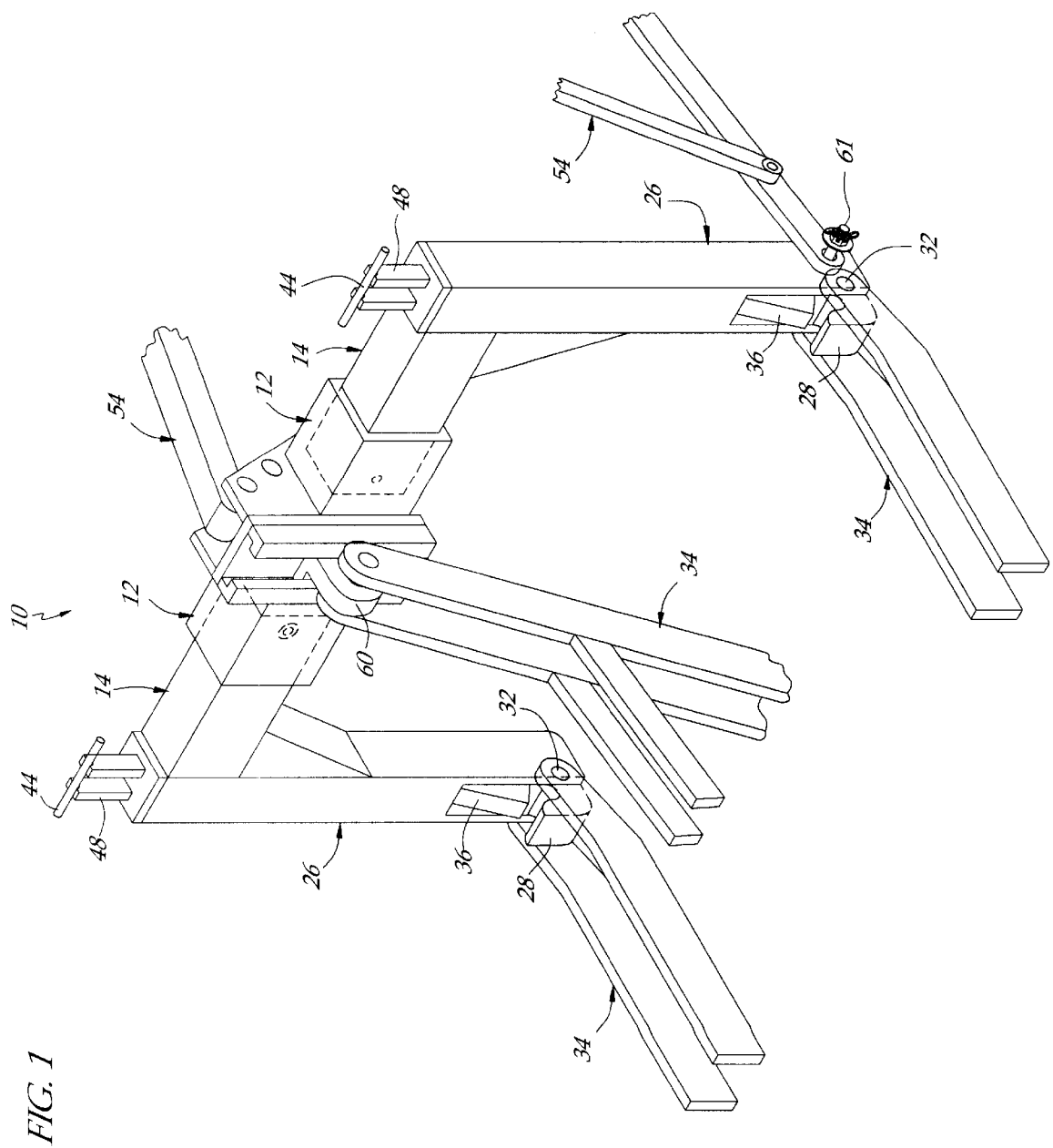
FIG. 1 is a perspective view of the apparatus on the tractor.
Figure 2:
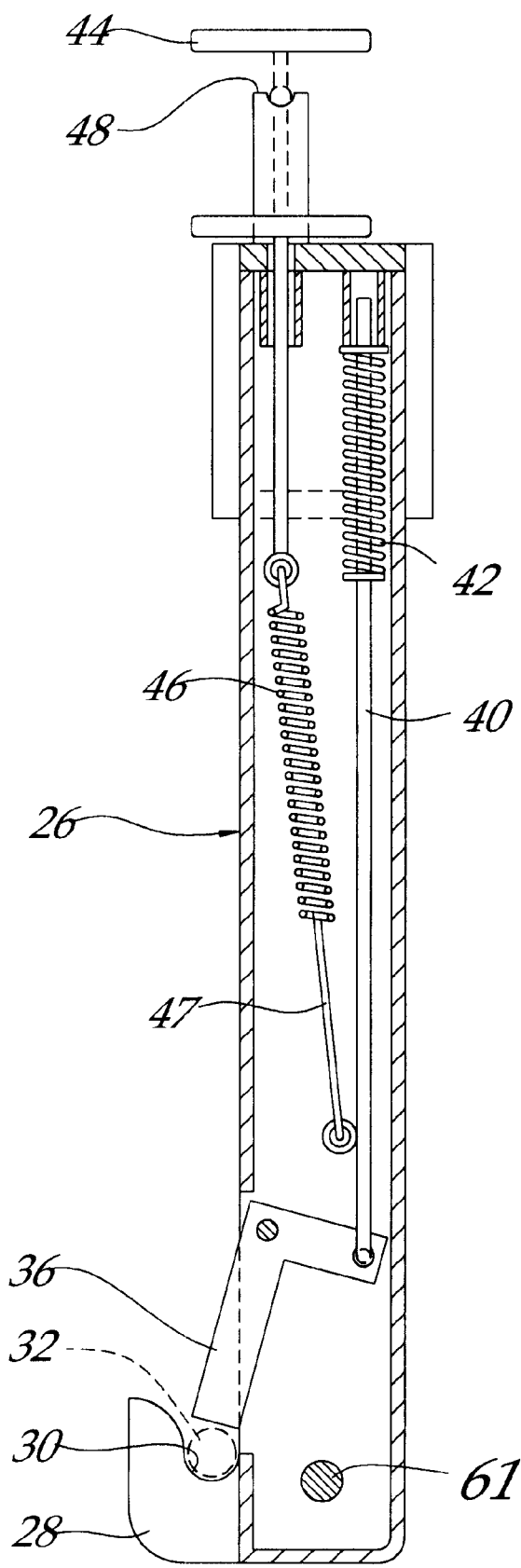
FIG. 2 is a section view of one leg.
Figure 3:
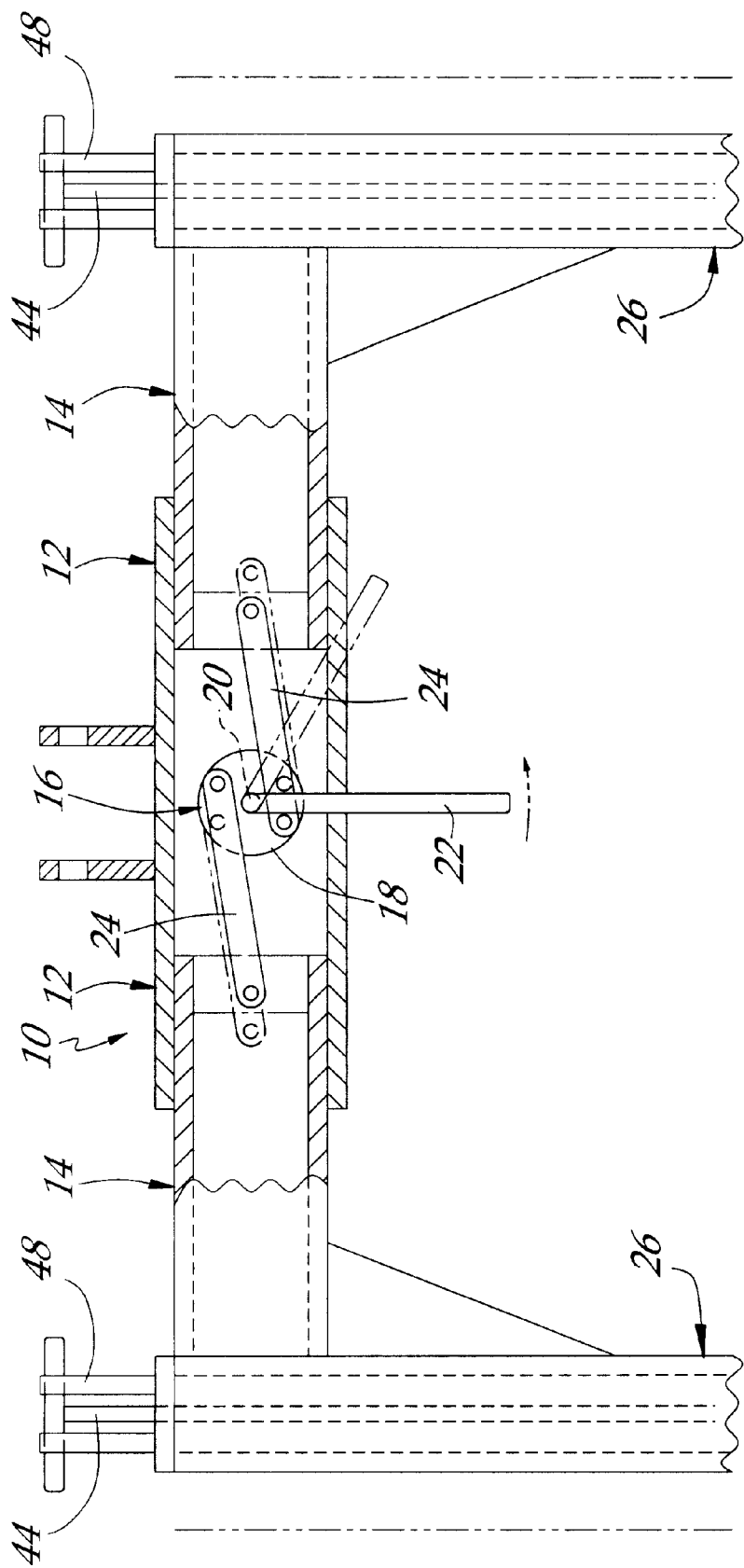
FIG. 3 is a section view of the centerpiece.
Figure 4:
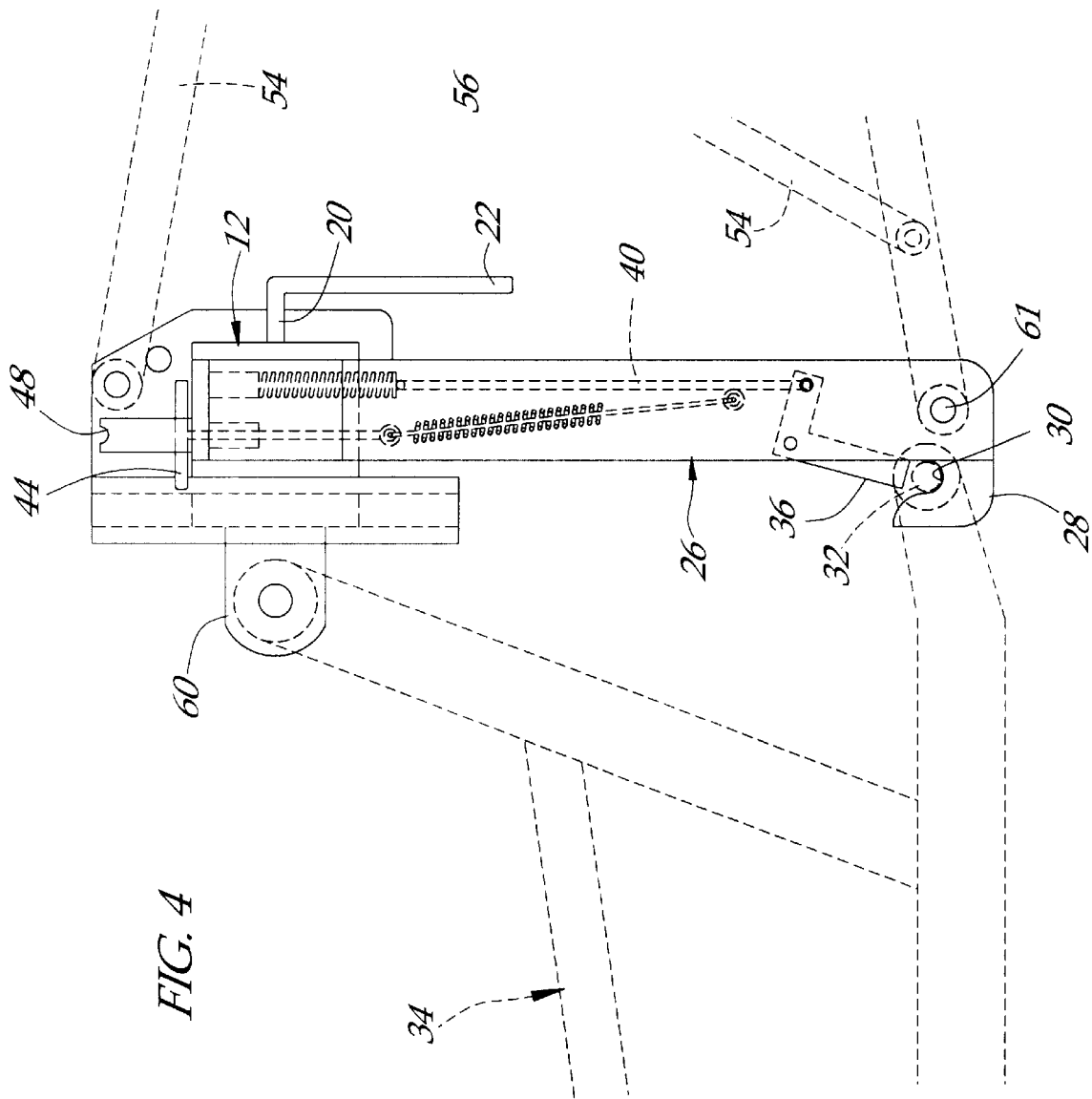
FIG. 4 is a side view of the centerpiece.
Figure 5:
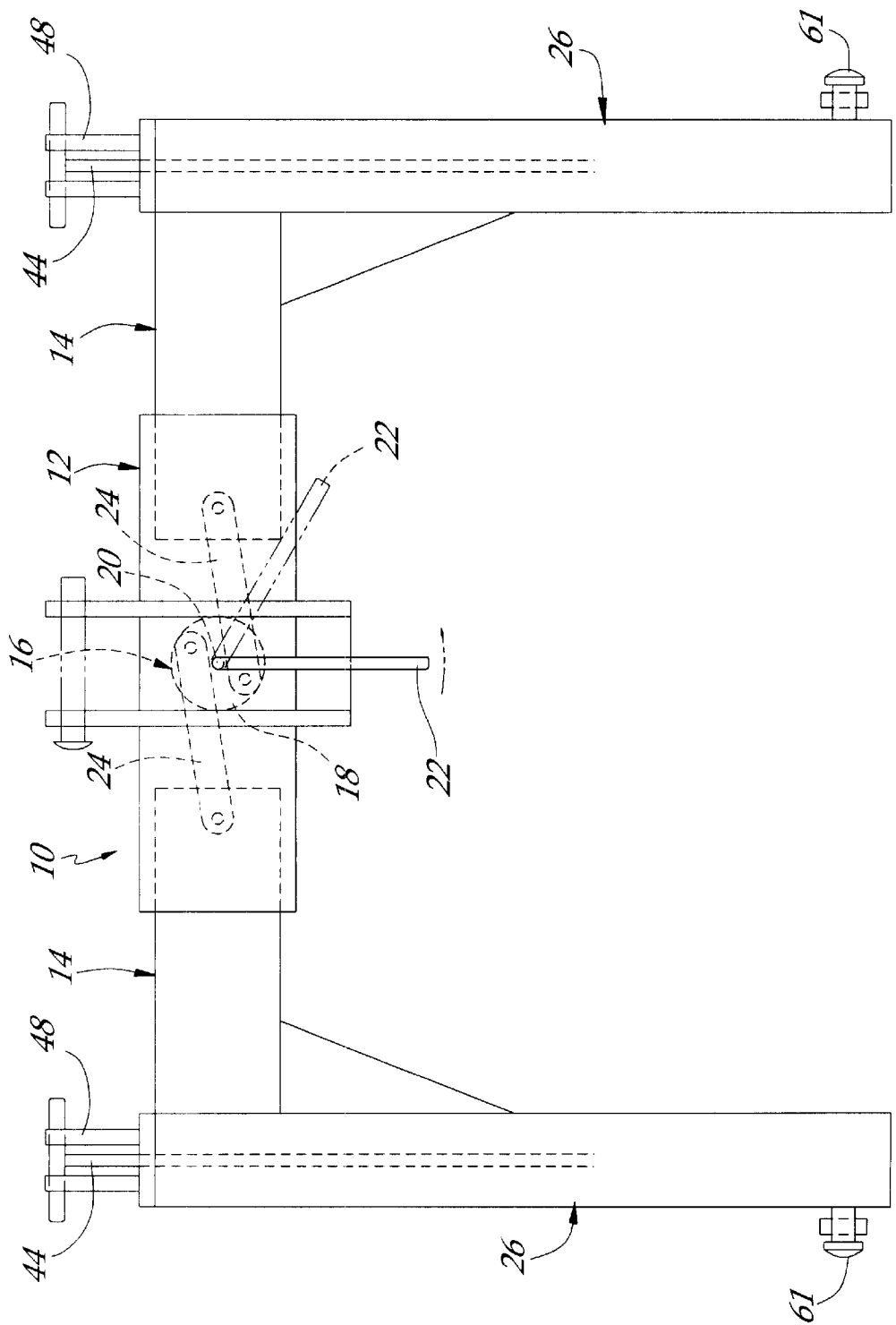
FIG. 5 is a front view of the centerpiece.
Figure 6:
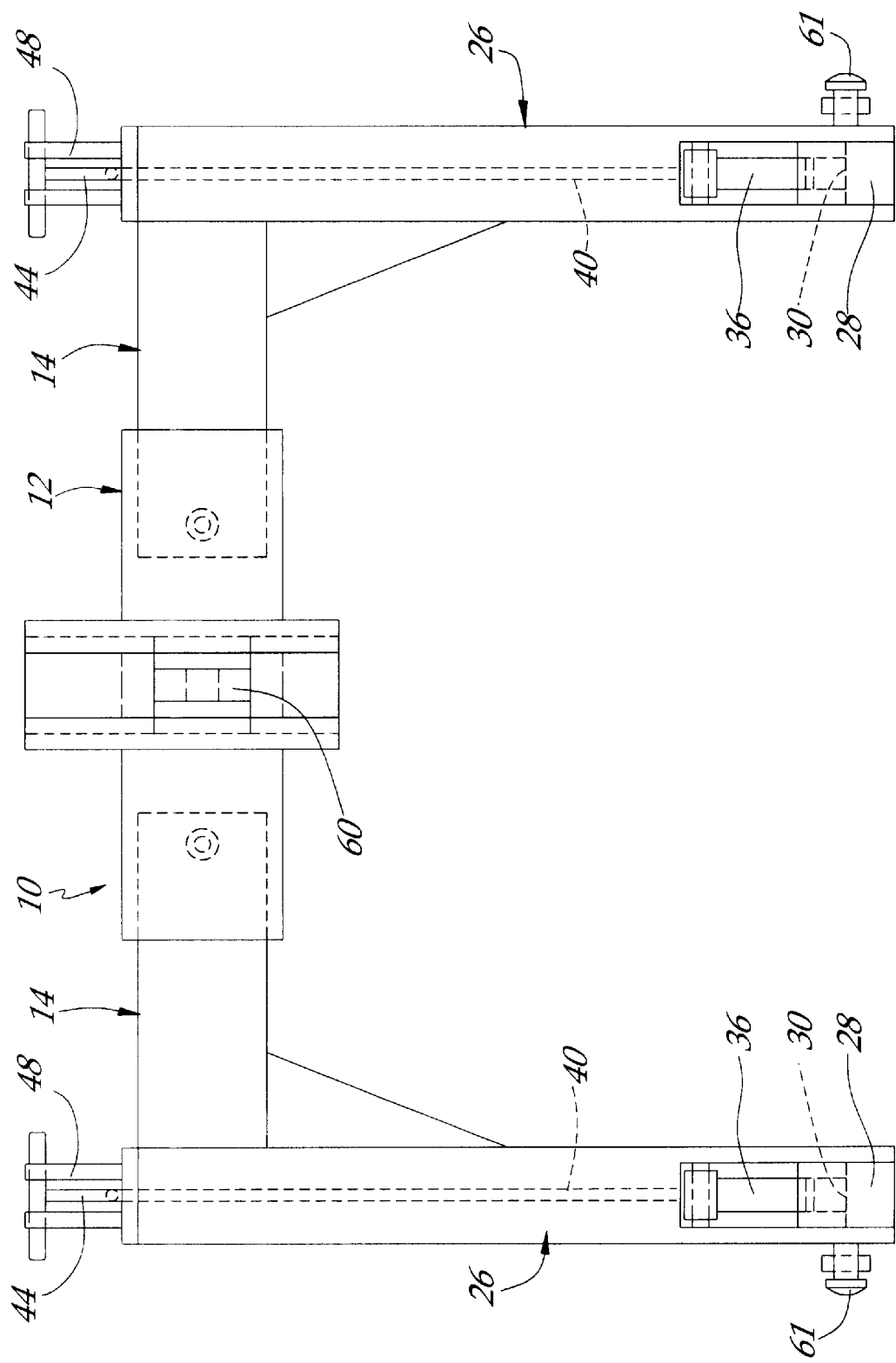
FIG. 6 is a back view of the centerpiece.

FIG. 1 depicts a horizontal cross bar 10 comprising a rectangular tubular centerpiece 12 having two horizontal tubular members 14 that telescopically insert into the rectangular piece 12. Its horizontal tubular members 14 are connected to a bell crank 16 mounted in the center of rectangular centerpiece 12. Bell crank 16 includes of a cam plate 18, mounted for rotation on an axis 20, positioned transverse to the horizontal cross bar 10.

The bell crank 16 is operated by a handle 22 that rotates the cam about the axis 20. Cam plate 18 connects to tubular member 14 using two opposing adjustment rods 24 when cam plate 18 is rotated by the handle 22, the two horizontal tubular members 14 move laterally. Affixed to the horizontal cross bar 10 at opposing ends of tubular members 14, are two steel vertical tubular members, legs 26. Each vertical member 26 has a protruding toe 28 having a groove 30 wherein a pin 32 from an implement 34 may be received. Pin 32 from implement 34, when received in the groove 30 is held in place by a pivotally mounted L-shaped latch 36 biased in the open position by a spring-loaded rod 40. Spring loaded rod 40 is mounted within each vertical tubular member 26 for vertical movement and urged against the latch 36 by a compression spring 42. A slidable T-shaped pin 44 is mounted on each vertical tubular member 26 and extends downward into each member 26 circumscribed by an expansion spring 46 about rod 47. To hold each latch 36 over each groove 30, T-shaped pin 44 is displaced vertically, holding the expansion spring 46 under tension and placed in cradle 48 is mounted at the top of each vertical member 26. Thus, expansion spring 46 overcomes compression spring 42 to pivot latch 36 into locking position. On the front of an adapter 50, a clevis 52 is attached to the tubular centerpiece 12, as well as a pin 61 carried by each vertical member 26 to enable the attachment of the adapter to a three-point hitch 54 of a tractor 56 with pins 32. An implement clevis in mounted to centerpiece 12 on the implant side of the adapter.

In operation, an implement 34 is attached to the three-point hitch adapter 50 by placing pins connected to implement 34 in the groove 30 of the adapter 50. A tongue 60 is also used to attach implement 34 to the adapter 50. The T-shaped pin 44 on the adapter 50 is then placed in the cradle 48, causing the tension in the expansion spring 46 to lock the latch 36 over the groove 30. To remove the implement 34, the T-shaped pin 44 is removed from the cradle 48, thereby releasing the latch 36 on the toe 28 of the adapter 50, and tongue 60 is detached from the implement. Note that spring 42 serves to bias the latch to the open position and should the implement not disengage because the latch is retained against the pin, releasing pin 44 from cradle 48 will free spring 44 to open the latch after the operator has returned to the tractor and jostled the implement slightly. This prevents the operator from having to return to the ground to disengage the implement.

While I have shown my invention in a single form it is to be understood that the apparatus may be embodied in as many forms are encompassed within the scope of the appended claims.

What is claimed is:

1. An attachment for a tractor for quickly connecting implements to the tractor utilizing the three-point hitch of the tractor comprising:

a. a cross bar comprising a rectangular tubular centerpiece having first and second tubular members telescopically inserted there within for selective displacement laterally while remaining engaged within said centerpiece, a cam plate mounted for rotation within said centerpiece on an axis transversely of said tubular members said cam plate having opposing lobes, first and second adjustment rods operatively connected between said opposing lobes and said first and second tubular members, a handle connected to said cam plate for rotating said cam plate about said axis urging said lobes up to ninety degrees in the direction of rotation, thereby selectively adjusting the extension of said members from said centerpiece;

b. first and second leg members affixed to said tubular members and depending there from, each leg member having a toe having a groove therein for receiving a connecting pin from an implement, a pivotally mounted latch for selectively closing said groove to prevent egress of a pin from said groove, a rod slid ably mounted within said leg and connected to said latch, a compression spring coaxially mounted about said rod to urge said latch to an open position, a T pin slid ably mounted to said tubular member and extending downwardly into said leg, an expansion spring connected between said T pin and said rod, a cradle formed on top of said member for holding said T pin at a height above said member with said expansion spring under tension and said latch member in position to close said groove;

c. first, second, and third clevis members affixed to said center piece and said leg members respectively for receiving connecting pins there through; and d. a clevis member affixed to said centerpiece opposite said first clevis member.

* * * * *